(12) United States Patent
Thomas et al.

(10) Patent No.: US 8,898,064 B1
(45) Date of Patent: Nov. 25, 2014

(54) IDENTIFYING CANDIDATE PASSWORDS FROM CAPTURED AUDIO

(75) Inventors: Ryan P. Thomas, Redmond, WA (US); Nikko Strom, Kirkland, WA (US)

(73) Assignee: Rawles LLC, Wilmington, DE (US)

( * ) Notice: Subject to any disclaimer, the term of this patent is extended or adjusted under 35 U.S.C. 154(b) by 253 days.

(21) Appl. No.: 13/424,104

(22) Filed: Mar. 19, 2012

(51) Int. Cl.
  *G10L 21/00* (2013.01)
  *G10L 25/00* (2013.01)
  *G10L 17/00* (2013.01)

(52) U.S. Cl.
  CPC ........................... *G10L 17/00* (2013.01)
  USPC ............................. 704/273; 704/270; 704/275

(58) Field of Classification Search
  USPC .................................................. 704/270–275
  See application file for complete search history.

(56) References Cited

U.S. PATENT DOCUMENTS

| | | | | |
|---|---|---|---|---|
| 6,094,632 | A * | 7/2000 | Hattori | 704/239 |
| 6,332,122 | B1 * | 12/2001 | Ortega et al. | 704/270 |
| 6,400,805 | B1 * | 6/2002 | Brown et al. | 379/88.01 |
| 6,529,871 | B1 * | 3/2003 | Kanevsky et al. | 704/246 |
| 6,973,426 | B1 * | 12/2005 | Schier et al. | 704/246 |
| 7,418,392 | B1 | 8/2008 | Mozer et al. | |
| 7,720,683 | B1 | 5/2010 | Vermeulen et al. | |
| 7,774,204 | B2 | 8/2010 | Mozer et al. | |
| 2006/0293898 | A1 * | 12/2006 | Ollason | 704/273 |
| 2007/0207767 | A1 * | 9/2007 | Reuss | 455/403 |
| 2012/0223885 | A1 | 9/2012 | Perez | |

FOREIGN PATENT DOCUMENTS

WO  WO2011088053  7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

Primary Examiner — Jesse Pullias
(74) Attorney, Agent, or Firm — Lee & Hayes, PLLC

(57) ABSTRACT

A computing device configured to request a password from a user, capture audio after issuing the request, and determine a number of alternative candidate passwords most likely represented by the audio. After identifying the number of candidate passwords, the computing device may submit these candidate passwords, one at a time, to an entity until the entity grants the device access to an account associated with the user or until the device has submitted each candidate password. The account may comprise a network account (e.g., a wired or wireless network account), an online account (e.g., an email account, an account an online merchant, etc.), or the like.

23 Claims, 7 Drawing Sheets

IDENTIFYING CANDIDATE PASSWORDS FROM CAPTURED AUDIO

BACKGROUND

Homes are becoming more wired and connected with the proliferation of computing devices such as desktops, tablets, entertainment systems, and portable communication devices. As computing devices evolve, many different ways have been introduced to allow users to interact with these devices, such as through mechanical means (e.g., keyboards, mice, etc.), touch screens, motion, and gesture. Another way to interact with computing devices is through speech.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
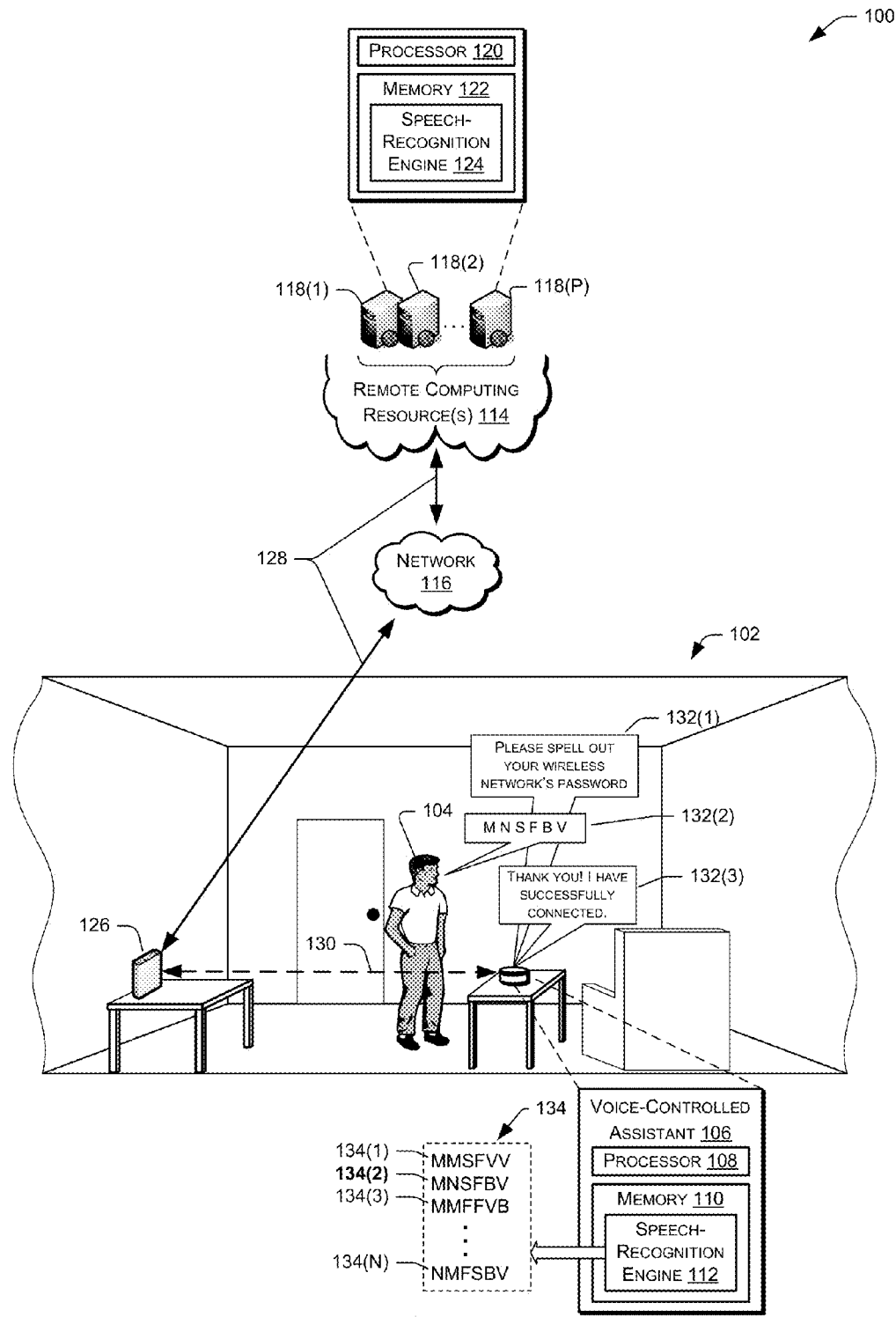
FIG. 1 shows an illustrative voice interaction computing architecture set in a home environment. The architecture includes a voice-controlled assistant physically situated in the home, along with a user who is spelling out a password for the user's wireless network to allow the voice-controlled assistant to access this network. In response to capturing audio of the user's utterance, the assistant formulates a list of the candidate passwords most likely spelled by the user and submits these candidate passwords, one at a time, until the assistant successfully connects to the wireless network or until submittal of each word from the list.

This disclosure describes, in part, a computing device configured to request a password from a user, capture audio after issuing the request, and determine a number of alternative candidate passwords most likely represented by the audio. After identifying the number of candidate passwords, the computing device may submit these candidate passwords, one at a time, to an entity until the entity grants the device access to an account associated with the user or until the device has submitted each candidate password. The account may comprise a network account (e.g., a wired or wireless network account), an online account (e.g., an email account, an account at an online merchant, etc.), or the like.

If the device receives access to the account using one of the alternative candidate passwords, the device may provide an audible or visual indication that the entity has granted the device access. If, however, the entity does not grant the device access even after the device submits each of the candidate passwords, then the device may provide a corresponding indication to the user.

To provide an example, a computing device may include a microphone and a speaker for audibly interacting with a user. The device may additionally include one or more network interfaces (e.g., a wireless network interface, a wired network interface, etc.). This network interface may be used to connect the computing device to one or more networks, such as a wireless network available in a home or business in which the device is located, a wired network to which the device physically couples, and the like. However, in instances where a network is password protected, and thus requires entry of a password to successfully connect to the network, the computing device may need to submit the network password to a component of the network prior to gaining access. For instance, prior to successfully connecting to a wireless network, the computing device may need to submit the password associated with the wireless network to a wireless router, modem, or other network component.

Therefore, in response to the computing device seeking access to the network, the device may request that a user provide a password for the network. In one example, the device may issue a request for the password via the speaker. For instance, the device may request that the user spell out or speak the password. Of course, while the device outputs this request audibly in this example, the device may output this request visually or in any other manner in other examples.

After the device outputs the request, the user may spell or speak the password for the network. After capturing audio corresponding to the user's utterance, the device may perform speech recognition on the audio to identify a set of candidate passwords from the audio. For instance, if the device requested that the user speak the password, then the audio may decode the audio to identify a predefined number, N, of candidate passwords spoken by the user. In doing so, the device may determine, for each word, a probability that the audio included the candidate password (or a series of sounds that collectively form the candidate password). The device may then rank each of the N possible candidate passwords spoken by the user, for instance beginning with a candidate password having a highest probability or confidence level and ending within with a candidate password having the lowest probability or confidence level (of the N candidate passwords).

Thereafter, the device may submit at least one of the N candidate passwords to a component of the network as a password for connecting to the network. For instance, the device may begin by submitting a candidate password that has been determined to be the most likely password spoken in the audio. After submitting this candidate password, the device may receive a response from the component indicating whether or not the candidate password was effective to grant the device access to the network. If so, the device may output an indication (e.g., audibly, visually, etc.) to the user that the device has successfully connected to the network.

If, however, the component indicates that the candidate password was not effective for gaining access to the network (because the candidate password was not the correct password), then the device may submit the next most likely candidate password from the list of N candidate passwords. In some instance, the device may submit this second candidate password without indicating to the user that the first submitted candidate password failed to gain the device access to the network. The device may continue to submit candidate passwords according to the ranked list until the earlier of successfully connecting to the network or exhaustion of the list of N candidate passwords. If the device fails to successfully connect to the network after submitting each of the N candidate passwords, then the device may output an indication (e.g., audibly, visually, etc.) to the user that the device has failed to connect to the network. The device may also request that the user again speak the password or that the user spell out the password in this attempt.

In instances where the device requests that the user spell the password for the network, meanwhile, the device may determine a set of N candidate passwords likely spelled out by the user. To do so, the device may identify multiple alternative series of sounds (e.g., phonemes) that the user uttered, with each series of sounds (e.g., phonemes) representing a corresponding series of graphemes (e.g., letters, numbers, symbols, etc.). The device may also determine respective probabilities associated with each series of sounds or corresponding graphemes. The device may then rank these series of sounds/graphemes based on the probabilities.

Thereafter, the device may construct one or more candidate passwords from respective series of graphemes and may submit these candidate passwords, one at a time, as a password for the network. To illustrate, envision that the device determines that it is most likely that a user spelled "mnl" ("em en el"), and that the next most likely candidate password spelled by the user was "nnl" ("en en el"). As such, the device may submit the candidate password "mnl" to the component of the network. If the device successfully connects to the network in response, then the device may output a corresponding indication to the user. If, however, the device fails to connect to the network, then the device may submit the next most likely candidate password, "nnl", to the component of the network. As discussed above, the device may continue submitting these N candidate passwords, one at a time and according to the ranking, until the earlier of the device successfully connecting to the network or the device submitting each of the N candidate passwords without successfully connecting.

By determining a set of alternative candidate passwords spoken or spelled by a user and attempting to connect to a network or other account using these candidate passwords, the device may save the user from having to speak or spell out a password multiple times. That is, by mapping a single user utterance to multiple candidate passwords, and working through these candidate passwords in accordance with their corresponding probabilities, the device increases the chances of successfully connecting to a network or other account from a single user utterance.

The devices and techniques described above may be implemented in a variety of different architectures and contexts. One non-limiting and illustrative implementation is described below.

Illustrative Environment

FIG. 1 shows an illustrative voice interaction computing architecture 100 set in a home environment 102 that includes a user 104. The architecture 100 includes an electronic voice-controlled assistant 106 with which the user 104 may interact. In the illustrated implementation, the voice-controlled assistant 106 is positioned on a table within a room the home environment 102. In other implementations, it may be placed in any number of locations (e.g., ceiling, wall, in a lamp, beneath a table, under a chair, etc.). Further, more than one assistant 106 may be positioned in a single room, or one assistant may be used to accommodate user interactions from more than one room.

Generally, the voice-controlled assistant 106 has at least one microphone and at least one speaker to facilitate audio interactions with the user 104 and/or other users. In some instances, the voice-controlled assistant 106 is implemented without a haptic input component (e.g., keyboard, keypad, touch screen, joystick, control buttons, etc.) or a display. In certain implementations, a limited set of one or more haptic input components may be employed (e.g., a dedicated button to initiate a configuration, power on/off, etc.). Nonetheless, the primary and potentially only mode of user interaction with the electronic assistant 106 may be through voice input and audible output. One example implementation of the voice-controlled assistant 106 is provided below in more detail with reference to FIG. 2.

The microphone of the voice-controlled assistant 106 detects audio from the environment 102, such as sounds uttered from the user 104. As illustrated, the voice-controlled assistant 106 includes a processor 108 and memory 110, which stores or otherwise has access to a speech-recognition engine 112. As used herein, a processor may include multiple processors and/or a processor having multiple cores. The speech-recognition engine 112, meanwhile, performs speech recognition on audio captured by the microphone, such as utterances spoken by the user 104. The voice-controlled assistant 106 may perform certain actions in response to recognizing different speech from the user 104. The user may speak predefined commands (e.g., "Awake"; "Sleep"), or may use a more casual conversation style when interacting with the assistant 106 (e.g., "I'd like to go to a movie. Please tell me what's playing at the local cinema.").

In some instances, the voice-controlled assistant 106 may operate in conjunction with or may otherwise utilize computing resources 114 that are remote from the environment 102. For instance, the voice-controlled assistant 106 may couple to the remote computing resources 114 over a network 116. As illustrated, the remote computing resources 114 may be implemented as one or more servers 118(1), 118(2), . . . , 118(P) and may, in some instances form a portion of a network-accessible computing platform implemented as a computing infrastructure of processors, storage, software, data access, and so forth that is maintained and accessible via a network such as the Internet. The remote computing resources 114 do not require end-user knowledge of the physical location and configuration of the system that delivers the services. Common expressions associated for these remote computing devices 114 include "on-demand computing", "software as a service (SaaS)", "platform computing", "network-accessible platform", "cloud services", "data centers", and so forth.

The servers 118(1)-(P) include a processor 120 and memory 122, which may store or otherwise have access to a speech-recognition engine 124 for recognizing speech and, potentially, causing performance of an action in response. The voice-controlled assistant 106 may utilize the speech-recognition engine 124 in addition to, or instead of, the speech-recognition engine 112. For instance, when the voice-controlled assistant 106 is able to connect to the remote computing resources 114 via the network 116, the voice-controlled assistant 106 may upload audio data to the remote computing resources 114 for processing. In some implementations, the remote computing resources 114 have a computational capacity that far exceeds the computational capacity of the voice-controlled assistant 106. Therefore, the voice-controlled assistant 106 may utilize the speech-recognition engine 124 for performing relatively complex analysis on audio captured from the environment 102.

In some implementations, the voice-controlled assistant 106 may receive vocal input from the user 104 and may perform speech recognition locally at the engine 112 and/or remotely at the resources 114. In either instance, the vocal input may be interpreted to form an operational request or command. The requests may be for essentially type of operation, such as database inquires, requesting and consuming entertainment (e.g., gaming, finding and playing music, movies or other content, etc.), personal management (e.g., calendaring, note taking, etc.), online shopping, financial transactions, and so forth.

The voice-controlled assistant 106 may communicatively couple to the network 116 via wired technologies (e.g., wires, USB, fiber optic cable, etc.), wireless technologies (e.g., RF, cellular, satellite, Bluetooth, etc.), or other connection technologies. The network 116 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

The network 116 may carry data, such as audio data, between the remote computing resources 114 and the voice-controlled assistant 106. However, in order for the voice-controlled assistant 106 to communicate with the remote computing resources 114 or other network resources, the voice-controlled assistant 106 must first gain access to a network connection. As illustrated, the room environment 102 includes a network component 126 that maintains a connection with the example network 116. For instance, the network component 126 may comprise a wireless router, a modem, or any other network component that allows computing devices coupled thereto to access network resources via the illustrated network 116. In FIG. 1, arrows 128 represent a network connection between the network component 126, the network 116, and the remote computing resources 114.

Therefore, in FIG. 1, the voice-controlled assistant 106 may attempt to establish a connection with the network component 126 for the purpose of accessing the network 116 and, hence, the remote computing resources 114 and/or other network resources. FIG. 1 illustrates this potential connection via an arrow 130. The voice-controlled assistant 106 may attempt to connect to the network component 126 in response to receiving a request to do so from the user, in response to being initially powered on and identifying a wireless network identifier pushed by the network component 126, or in response to any other trigger.

In one implementation, upon initial power up, the voice-controlled assistant 106 is configured to seek a network connection, which may include initially prompting the user to provide an identifier of a network (e.g., a wireless network) of the user 104. For instance, the voice-controlled assistant 106 may emit, via the speaker, a request that the user 104 speak or spell an identifier of the user's wireless network (e.g., the name, the SSID, etc.).

In response, the user 104 may speak or spell an identifier of the user's network. The microphone of the voice-controlled assistant 106 may capture this audio and the local speech-recognition engine 112 may perform speech recognition techniques on the audio to identify one or more potential network identifiers from the audio. That is, the speech-recognition engine 112 may perform speech recognition techniques to identify sounds within the audio and may construct potential network identifiers from the audio based on sequences of the identified sounds.

In some examples, the voice-controlled assistant 106 may include a network interface that is able to identify available networks. For instance, the interface may comprise a wireless network interface that recognizes wireless networks in proximity to the voice-controlled assistant 106. In these instances, the voice-controlled assistant 106 may compare the potential network identifiers recognized in the audio with the available wireless networks to identify the network of the user. For instance, the voice-controlled assistant 106 may recognize that the user stated "Smith Family" in response to the assistant's request, may identify an available network of the same name, and may therefore determine that the name of the user's network is in fact "Smith Family".

Thereafter, the voice-controlled assistant 106 may request that the user 104 speak or spell out the password for the user's network (e.g., the wireless network, "Smith Family"). In the illustrated example, at 132(1), the voice-controlled assistant 106 emits an audible request to the user 104 to spell out the password of the user's wireless network. Spelling a password may be more effective than speaking a password, in some instances, as the user 104 may more easily specify different symbols, whether a letter is capitalized or not, whether there is a space between certain characters, and the like.

At 132(2), the user 104 spells the password in the form of the following string of characters: "M N S F B V". While this example password includes only letters, in other instances a user's passwords may additionally or alternatively include letters, symbols, and/or any other type of grapheme from any language. Furthermore, while the user 104 simply states the letters in this example, in instances where a password is case-sensitive the user 104 may indicate whether a letter is uppercase or lowercase (e.g., "Capital M, Capital N, . . . ").

As the user 104 spells the illustrated password, the microphone of the voice-controlled assistant 106 may capture audio within the environment 102, including the spelling of the password by the user. In response to receiving this audio, the speech-recognition engine 112 may attempt to identify multiple alternative candidate passwords 134(1), 134(2), 134(3), . . . , 134(N) (collectively "candidate passwords 134") from the audio. That is, rather than mapping the audio to a single, most likely candidate password from the audio, the speech-recognition engine 112 may identify a set of "N" candidate passwords most likely to be represented by the captured audio.

To identify the most likely "N" candidate passwords after the user 104 has been instructed to spell the password for the user's wireless network, the speech-recognition engine 112 may identify multiple sequences of graphemes (i.e., characters) from the most likely series of sounds from the user's speech. For instance, the speech-recognition engine 112 may employ a probabilistic model that both identifies candidate passwords from the user's speech and assigns a probability to each password. Each candidate password's respective probability indicates the likelihood that the user did indeed spell that particular candidate password. The speech-recognition engine 112 may utilize Hidden Markov Model(s), Neural Network techniques, Dynamic Time Warping, and/or any other speech-recognition techniques.

In the illustrated example, for instance, the user 104 spells out the letters "M N S F B V". The speech-recognition engine 112, in response, identifies the candidate password 134(1) ("MMSFVV") as the most likely sequence of graphemes spelled by the user 104. In addition, the speech-recognition engine 112 identifies "MNSFBV" as the next most likely candidate password, "MMFFVB" as the next most likely candidate password, and so forth, until the N$^{th}$-most-likely candidate password "NMFSBV". The speech-recognition engine 112 may be configured to identify the ten most likely candidate passwords from the user's speech, the fifty most likely candidate passwords, or any other number of candidate passwords.

After identifying and ranking the "N" most likely candidate passwords, the voice-controlled assistant 106 may submit the candidate passwords, one at a time, to the network component 126 as a password of the network. The voice-controlled assistant may continue doing so until the earlier of successfully connecting to the network component 126 (and, hence, the associated wireless network) or until exhaustion of the list of "N" most likely candidate passwords.

To illustrate, after identifying and ranking the list of "N" candidate passwords, the voice-controlled assistant 106 may submit, to the network component 126, the candidate password 134(1) deemed to be the most likely password spelled by the user. After submitting the candidate password 134(1) to the network component 126 as a password for the wireless network, the voice-controlled assistant 106 may determine whether or not a successful connection has been established. If so, then the voice-controlled assistant 106 may provide an indication to the user 104 that a successful connection has been established. This indication may be provided audibly, visually, or in any other manner. For instance, the speaker of the voice-controlled assistant 106 may provide a predefined sound affect (e.g., a ding), may state that the connection has been established, or may audibly emit the indication in any other manner. In the illustrated example, at 132(2) the voice-controlled assistant 106 states the following upon a successful connection: "Thank you! I have successfully connected."

In the instant example, however, the voice-controlled assistant 106 will not successfully connect to the user's wireless network upon submitting the candidate password 134(1), given that this candidate password does not match the password spelled by the user 104 (corresponding to the actual password of the network). As such, after determining that a successful connection has not been established, the voice-controlled assistant 106 may submit the candidate password 134(2) that it has determined to be the next most likely password spelled by the user 104. Given that this candidate password 134(2) matches the actual password of the network as spelled by the user 104, the voice-controlled assistant 106 will thereafter determine that a successful connection has been established with the network component 126 and the corresponding wireless network. As such, the voice-controlled assistant 106 may announce the indication of the successful connection at 132(2). After successfully connecting to the wireless network of the user 104, the assistant 106 can now access the remote computing resources 114 for performing future speech recognition. Additionally or alternatively, the assistant 106 can now access other network resources for performing actions requested by the user 104 or for any other purpose.

By identifying a set of "N" candidate passwords that are most likely to have been spelled out by the user 104, the voice-controlled assistant 106 avoids having to continually request that the user 104 re-spell the password in the event that the speech-recognition engine 112 does not accurately identify the password from the audio in a first pass. Instead of the continually querying the user 104 in that manner, the voice-controlled assistant 106 is able to silently submit the "N" candidate passwords 134, one at a time, until either a successful connection is established or until each of the "N" candidate passwords has been submitted and no connection has been established.

While FIG. 1 and the corresponding discussion describes these techniques in the context of the user 104 spelling the password, the techniques may also apply to the user 104 stating the password itself. For instance, if the password were "Gorilla", the voice-controlled assistant 106 assistant may identify the "N" most likely words stated by the user and may submit these words, one at a time, as discussed above. In this example, the speech recognition engine may determine a set of words including "Gorilla", "gorilla", "Guerilla", "guerilla", and the like. The voice-controlled assistant 106 may then submit these words, one at a time, as a password for the network based on the respective probabilities associated with each word.

Illustrative Voice-Controlled Assistant

Figure 2:
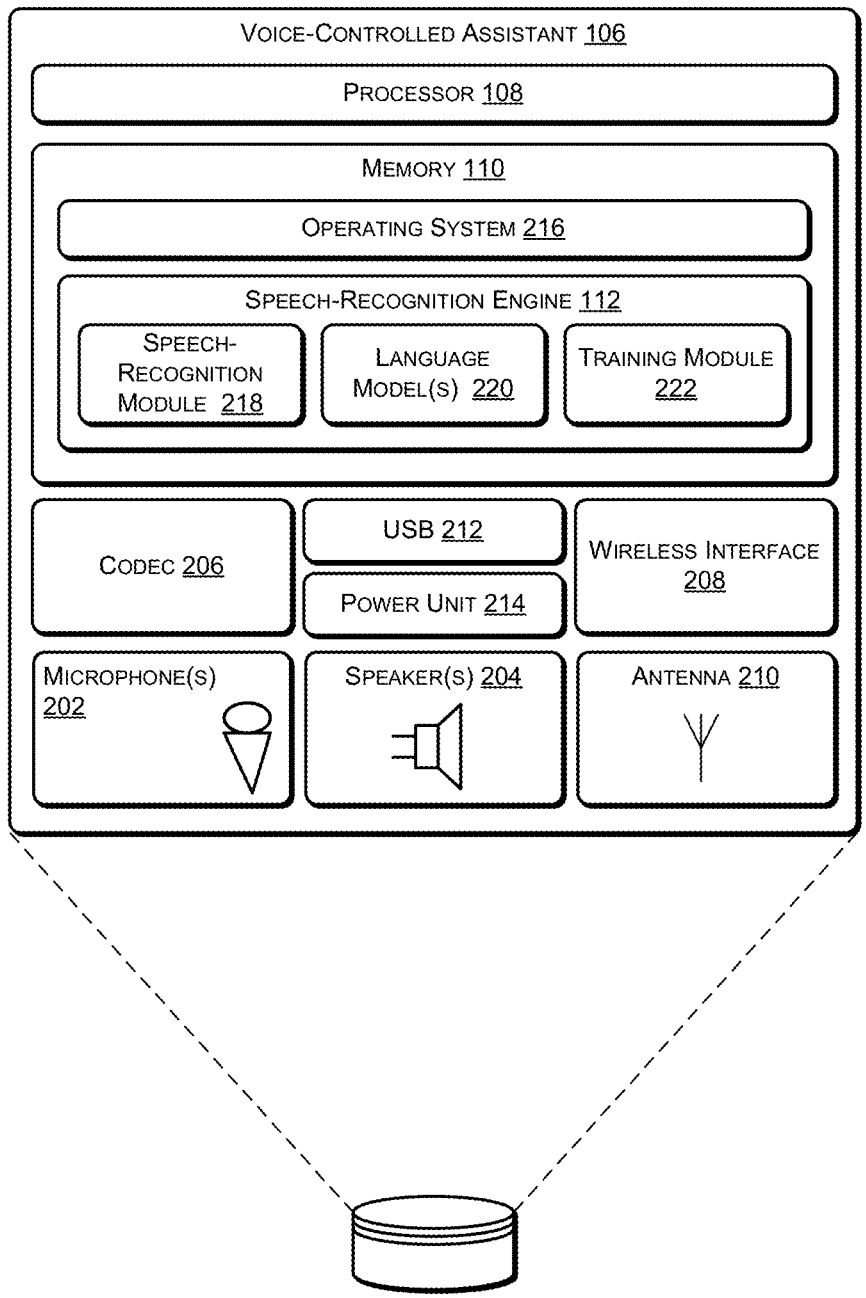
FIG. 2 shows a block diagram of selected functional components implemented in the voice-controlled assistant of FIG. 1.

FIG. 2 shows selected functional components of the voice-controlled assistant 106 in more detail. Generally, the voice-controlled assistant 106 may be implemented as a standalone device that is relatively simple in terms of functional capabilities with limited input/output components, memory and processing capabilities. For instance, the voice-controlled assistant 106 does not have a keyboard, keypad, or other form of mechanical input in some implementations, nor does it have a display or touch screen to facilitate visual presentation and user touch input. Instead, the assistant 106 may be implemented with the ability to receive and output audio, a network interface (wireless or wire-based), power, and limited processing/memory capabilities.

In the illustrated implementation, the voice-controlled assistant 106 includes the processor 108 and memory 110. The memory 110 may include computer-readable storage media ("CRSM"), which may be any available physical media accessible by the processor 108 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 108.

The voice-controlled assistant 106 includes one or more microphones 202 to receive audio input, such as user voice input, and one or more speakers 204 to output audio sounds. A codec 206 is coupled to the microphone 202 and speaker 204 to encode and/or decode the audio signals. The codec may convert audio data between analog and digital formats. A user may interact with the assistant 106 by speaking to it, and the microphone 202 captures the user speech. The codec 206 encodes the user speech and transfers that audio data to other components. The assistant 106 can communicate back to the user by emitting audible statements through the speaker 204. In this manner, the user interacts with the voice-controlled assistant simply through speech, without use of a keyboard or display common to other types of devices.

In the illustrated example, the voice-controlled assistant 106 includes a wireless interface 208 coupled to an antenna 210 to facilitate a wireless connection to a network. The wireless interface 208 may implement one or more of various wireless technologies, such as wife, Bluetooth, RF, and so on.

A USB port 212 may further be provided as part of the assistant 106 to facilitate a wired connection to a network, or a plug-in network device that communicates with other wireless networks. In addition to the USB port 212, or as an alternative thereto, other forms of wired connections may be employed, such as a broadband connection. A power unit 214 is further provided to distribute power to the various components on the assistant 106.

The voice-controlled assistant 106 is designed to support audio interactions with the user, in the form of receiving voice commands (e.g., words, phrase, sentences, etc.) from the user and outputting audible feedback to the user. Accordingly, in the illustrated implementation, there are no haptic input devices, such as navigation buttons, keypads, joysticks, keyboards, touch screens, and the like. Further there is no display for text or graphical output. In one implementation, the voice-controlled assistant 106 may include non-input control mechanisms, such as basic volume control button(s) for increasing/decreasing volume, as well as power and reset buttons. There may also be a simple light element (e.g., LED) to indicate a state such as, for example, when power is on. But, otherwise, the assistant 106 does not use or need to use any input devices or displays in some instances.

Several modules such as instruction, datastores, and so forth may be stored within the memory 110 and configured to execute on the processor 108. An operating system module 216 is configured to manage hardware and services (e.g., wireless unit, USB, Codec) within and coupled to the assistant 106 for the benefit of other modules.

In addition, the memory 110 may include the speech-recognition engine 112, discussed above. As illustrated, the speech-recognition engine 112 may include a speech-recognition module 218, one or more language models 220, and a training module 222. The speech-recognition module 218 may function to decode audio to identify sounds within the audio. The module 218 may then identify character strings either spoken or spelled from the audio based on the identified sounds. The speech-recognition module 218 may perform this speech recognition with reference to the one or more language models 220. In some instances, the voice-controlled assistant 106 utilizes a language model that is specifically designed to identify passwords that have been spelled by users. That is, the language model may be pre-configured to assist the speech-recognition module 218 in identifying sounds corresponding to particular graphemes, such as letters, numbers, symbols, and/or the like.

In addition, the speech-recognition engine 112 may utilize the training module 222 to retrain the language model(s) 220 or other language models based on interaction with a user. For instance, after the assistant 106 identifies which candidate password of a set of "N" most likely candidate passwords is a correct password, the training module 222 may use this correct passwords to retrain the language model(s) 220. This retraining effectively sharpens the model(s) for future use. In addition or in the alternative, the voice-controlled assistant 106 may provide an indication of the correct password, potentially along with the corresponding captured audio, to another entity to allow the other entity to train or retrain a model. For instance, the voice-controlled assistant 106 may provide an indication of the correct password and the corresponding audio to the remote computing resources 114 from FIG. 1. The remote computing resource 114 may then use this information to retrain a language model, such as a language model that is tailored for recognizing passwords.

Illustrative Processes

Figure 3A:
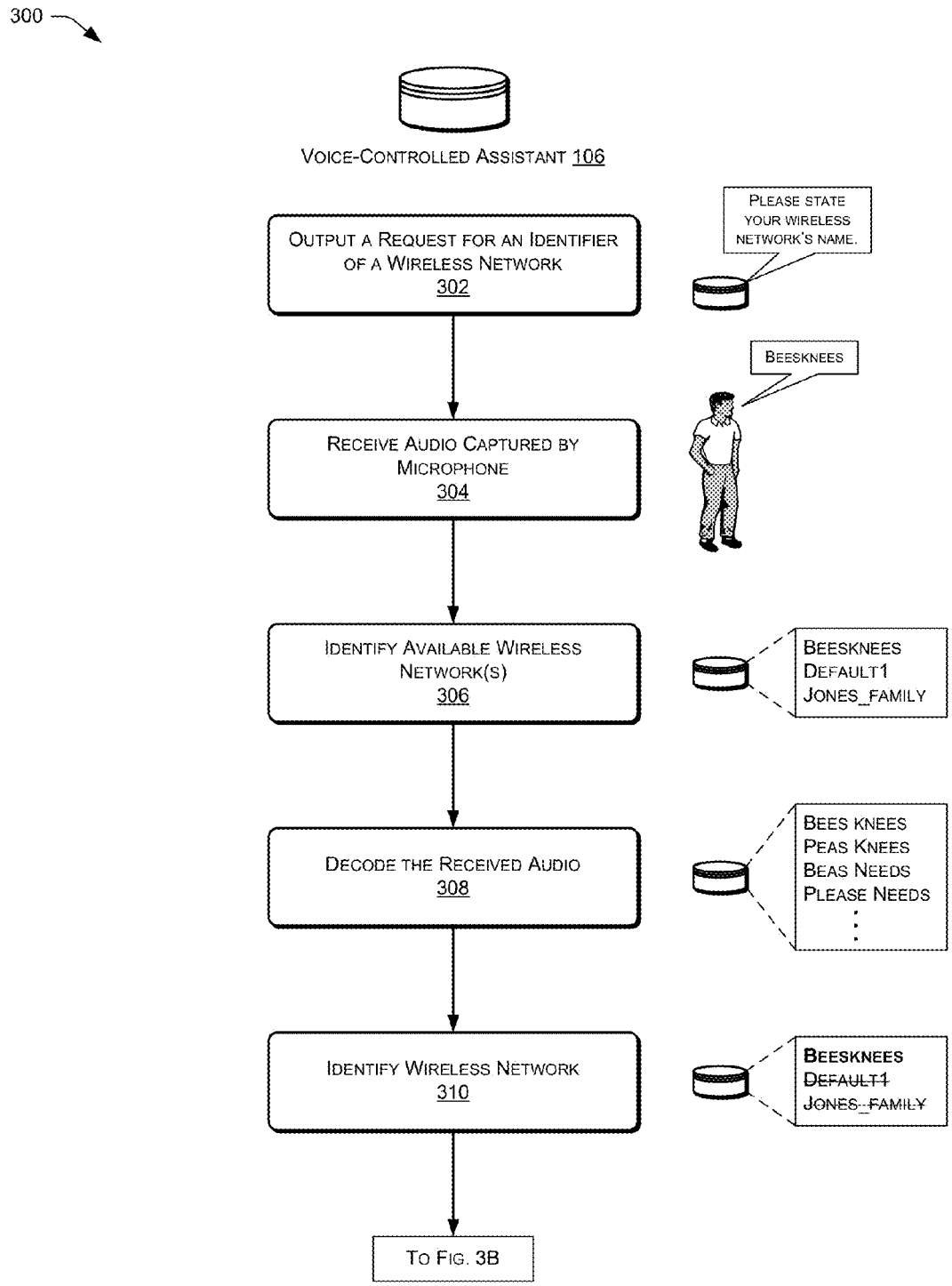
FIGS. 3A-3C depict a flow diagram of an example process of the voice-controlled assistant of FIG. 1 attempting to connect to a wireless network by formulating a list of candidate passwords most likely spelled or spoken by the user. The assistant then submits individual ones of the candidate passwords until a successful network join occurs or until exhausting the candidate passwords from the list.
Figure 3B:
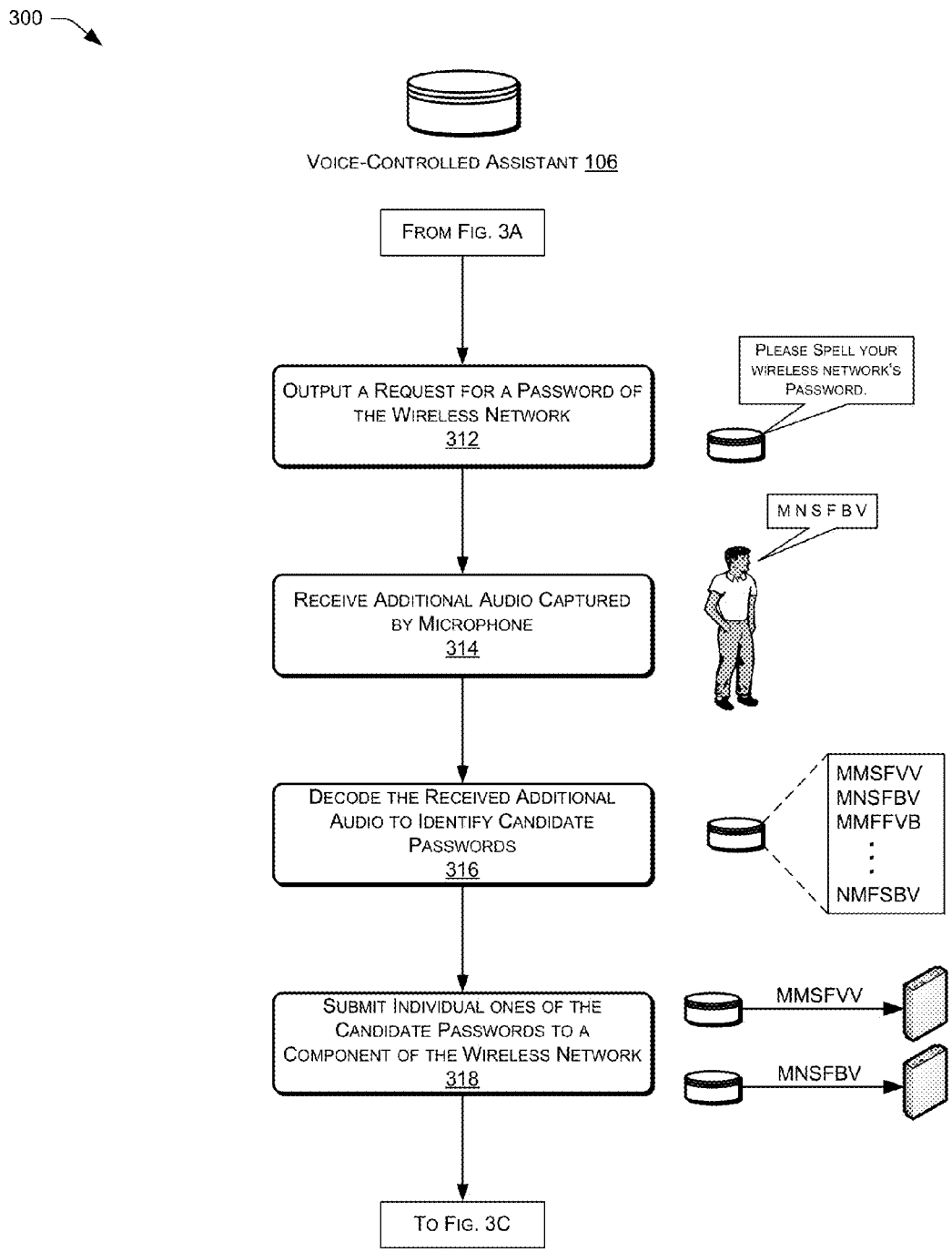
Figure 3C:
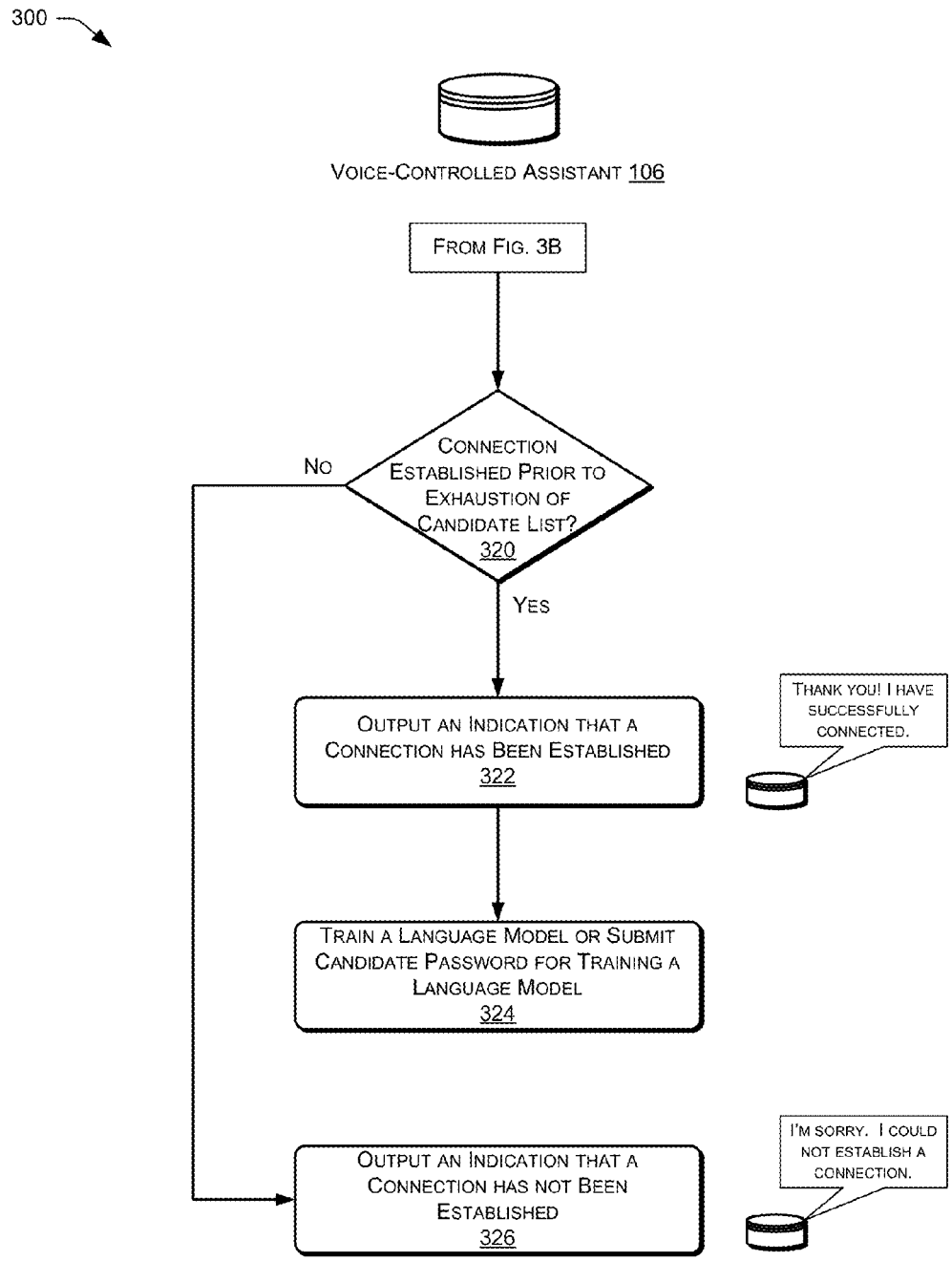

FIGS. 3A-3C depict a flow diagram of an example process 300 of the voice-controlled assistant 106 attempting to connect to a wireless network by formulating a list of candidate passwords most likely spelled or spoken by the user 104. The assistant 106 then submits each of these candidate passwords as the password until a successful network join occurs or until exhausting the candidate passwords from the list. While this process 300 is illustrated as being performed by the voice-controlled assistant 106, it is to be appreciated that other computing devices may similarly implement this process and/or other processes described throughout.

Furthermore, this process (as well as each process described herein) is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

At 302, the voice-controlled assistant 106 outputs a request for an identifier of a wireless network. For instance, the voice-controlled assistant 106 may be configured to output such a request upon an initial configuration of the assistant 106. While this example illustrates the assistant 106 outputting an audible request, in other instances the assistant may output this request visually or in any other suitable manner. Furthermore, while the voice-controlled assistant 106 is shown outputting a request to a user to state an identifier of the network, in other instances the assistant 106 may request that the user 104 spell the network identifier.

At 304, the voice-controlled assistant 106 receives audio captured by the microphone of the assistant. This audio may include the user 104 stating an identifier of the user's wireless network. In this example, the user 104 has stated the name of his wireless network, "Beesknees".

At 306, the voice-controlled assistant 106 may identify available wireless networks within the range of the wireless interface of the assistant 106. In the illustrated example, the voice-controlled assistant 106 has identified three different wireless networks in proximity to the assistant 106, including "Beesknees", "Default1", and "Jones_Family".

At 308, the voice-controlled assistant 106 decodes the received audio using speech-recognition techniques to identify one or more possible network identifiers from the audio. Given the user's utterance, in the illustrated example the assistant 106 identifies the following candidate network names spoken by the user 104, which may be ranked based on corresponding probabilities: "Bees Knees", "Peas Knees", "Beas Needs", and "Please Needs".

At 310, the voice-controlled assistant 106 identifies the wireless network of the user 104 by comparing the candidate network names determined at 308 with the available wireless networks identified at 306. In this example, the voice-controlled assistant 106 determines that the user 104 specified "Beesknees" as the user's wireless network.

FIG. 3B continues the illustration of the process 300 and includes, at 312, the voice-controlled assistant 106 outputting a request for a password of the identified wireless network. Again, the assistant 106 may output this request audibly, visually, or in any other manner. Furthermore, while the illustrated example shows the voice-controlled assistant 106 requesting that the user 104 spell this password, in other instances the assistant 106 may request that the user state the network password.

At 314, the voice-controlled assistant 106 receives audio captured by the microphone of the assistant 106 outputs the request for the password. This audio may include the user 104 spelling the user's network password. Continuing the example from FIG. 1, the user 104 again spells out the password "M N S F B V".

At 316, the voice-controlled assistant 106 decodes the received audio to identify a number of "N" candidate passwords. As discussed above, the assistant 106 may also rank these candidate passwords according to the respective probabilities associated with each one. FIG. 3B, for instance, illustrates that the assistant may generate the sequence of characters "MMSFVV" as the most likely candidate password from the audio, and so forth.

At 318, the voice-controlled assistant 106 then submits individual candidate passwords to a component of the wireless network until the earlier of successfully connecting to the wireless network or submitting each of the "N" candidate passwords. In this example, the assistant 106 submits the most likely candidate password first, followed by the next most likely candidate password before connecting to the wireless network of the user 104.

FIG. 3C continues the illustration of the process 300 and represents, at 320, determining whether the assistant 106 has successfully connected to the wireless network before exhausting the list of "N" candidate passwords. If the assistant has successfully connected, then at 322 the assistant outputs an indication that a connection has been established. In addition, at 324 the voice-controlled assistant 106 may train or retrain a language model using the successful candidate password or may submit the successful candidate password to another entity for training or retraining a language model.

If, however, the voice-controlled assistant 106 is unable to establish a connection even after submitting each of the "N" candidate passwords, then at 326 the assistant 106 outputs an indication to the user that no connection has been established. Again, the assistant 106 may output this indication audibly, visually, or in any other suitable manner.

Figure 4:
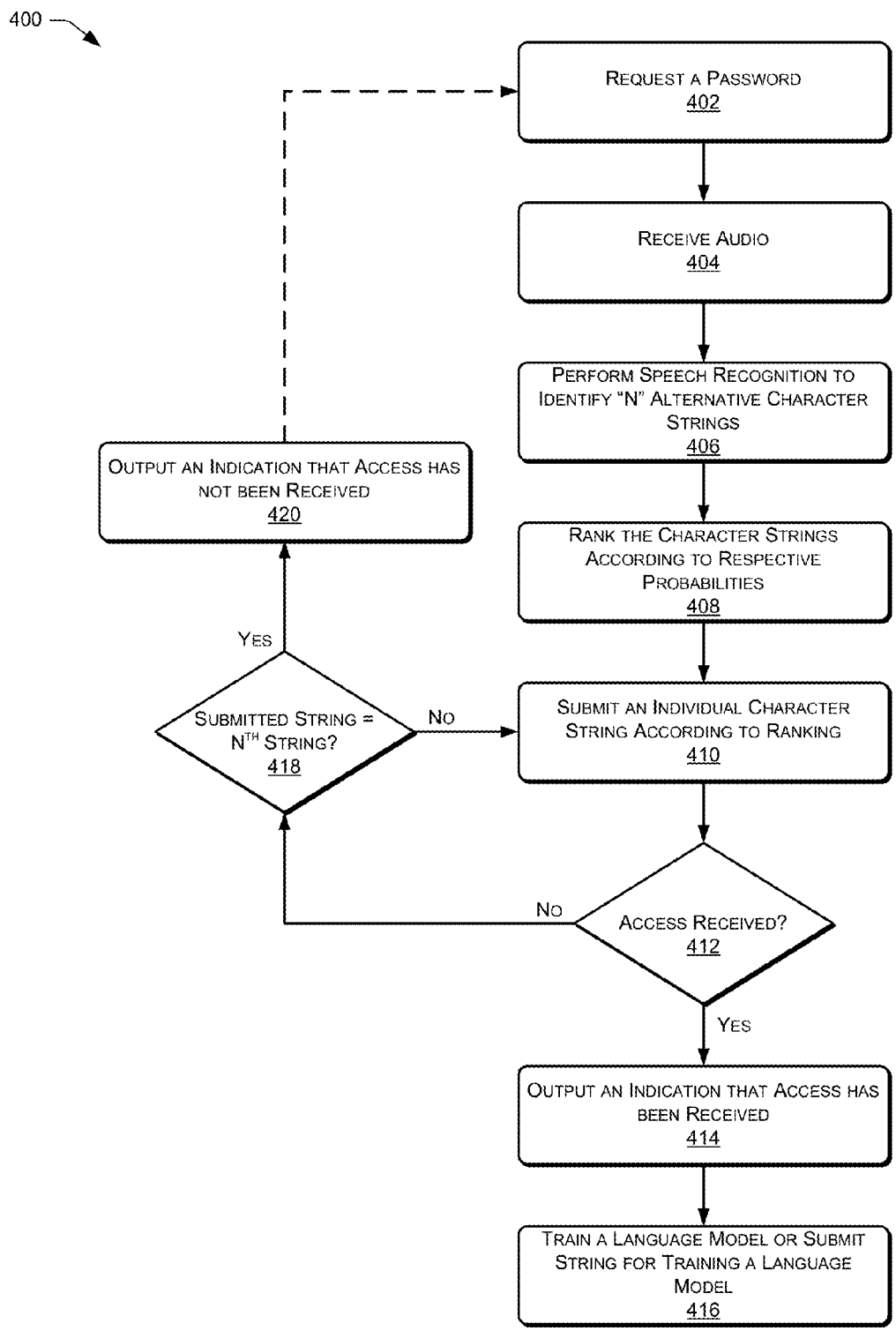
FIG. 4 depicts a flow diagram of an example process for performing speech recognition on audio uttered by a user, identifying "N" alternative character strings spelled or spoken by the user, ranking the character strings according to the respective probabilities that the utterance included the respective character strings, and submitting each of these character strings as a password for connecting to a network. This process ends upon a successful connection to the network or exhaustion of character strings from the list.

FIG. 4 depicts a flow diagram of an example process 400 for performing speech recognition on audio uttered by a user to identify "N" alternative character strings spelled or spoken by the user. The process 400 includes, at 402, requesting a password from a user. This password may be for gaining access to a network (e.g., wired or wireless), an online account of a user (e.g., an email account, an account at an online retailer), or for gaining access to any other type of account.

At 404, the process 400 receives audio captured at least partly after issuing the request. At 406, the process performs speech recognition on the captured audio to identify "N" alternative character strings represented by the audio. This may include identifying respective series of sounds that collectively form character strings, or identifying respective series of phones forming respective series of graphemes that collectively form character strings.

At 408, the process 400 ranks the alternative character strings according to their respective probabilities. That is, the speech recognition performed at 406 may assign a probability to each character string indicating the likelihood that the audio represented that particular character string. At 408, the process 400 may then rank the strings according to these probabilities in descending order beginning with a string having a highest probability.

At 410, the process submits an individual character string as a password for an account according to the ranking. For instance, the process 400 may first submit a character string having a highest probability. At 412, the process 400 may determine, after submitting the character string, whether access has been received. For instance, the process 400 may determine whether a connection has been established with a network, whether access has been granted to an online account of the user, or the like.

If so, then at 414 the process 400 outputs an indication that access to the account has been received. In addition, at 416 the process 400 may train a language model using the character string that resulted in the access or may provide the character string to another entity for training a language model.

If, however, the process determines at 412 that access has not been received, then at 418 the process 400 determines whether the string that was last submitted was the "$N^{th}$" string. If so, then the process 400 outputs, at 420, an indication that access has not been received. The process 400 may also loop back to 402 to again request the password from the user. If the string that was last submitted, however, is not the "$N^{th}$" string, then the process returns to 410 to submit another character string from the list of "N" character strings according to the previous ranking. For instance, the process 400 may submit a next-most-likely character string from the list.

Figure 5:
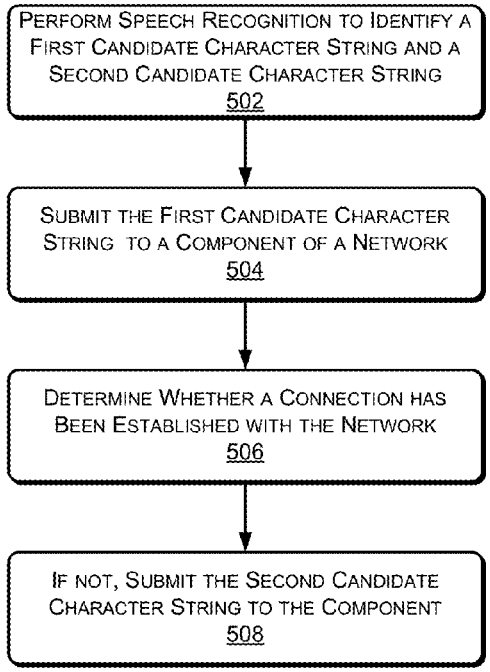
FIG. 5 depicts a flow diagram of an example process for identifying two candidate character strings spelled or spoken by a user, submitting the first candidate character string as a password for accessing a network, and, if no connection has been established using the first candidate character string, submitting the second candidate character string as the password.

FIG. 5 depicts a flow diagram of another example process 500 and includes, at 502, performing speech recognition to identify a first candidate character string spelled or spoken by a user and a second, different candidate character string spelled or spoken by the user. At 504, the process then submits the first candidate character string to a component of a network. At 506, the process 500 determines whether a connection to the network has been established. If not, then at 508 the process 500 submits the second candidate character string to the component of the network.

Figure 6:
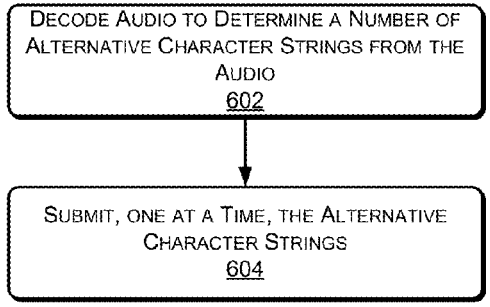
FIG. 6 depicts a flow diagram of an example process for decoding audio to identify a number of alternative character strings spelled or spoken by a user and then submitting these alternative character strings, one at a time, as a password for an account.

FIG. 6 depicts a flow diagram of another example process 600, which includes decoding audio at 602 to identify a number of alternative character strings spelled or spoken by a user. At 604, the process 600 then submits the alternative character strings, one at a time, until the earlier of authentication or submittal of each of the number of alternative character strings. For instance, the process 600 may submit the alternative character strings according to a ranked list of the strings until authentication, such as gaining access to a computing device, to an application, to a content item (e.g., a document), to an online account, to a wired or wireless network, or until any other sort of authentication occurs or until each string has been submitted.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims

What is claimed is:

1. An apparatus comprising;
a speaker;
a microphone;
a wireless network interface;
a processor; and
computer-readable media storing computer-executable instructions that, when executed on the processor, cause the processor to perform acts comprising:
causing the speaker to output a request for a password associated with a wireless network;
receiving audio captured by the microphone after the speaker outputs the request;
decoding the audio at least in part to identify alternative candidate passwords from the audio; and
submitting, one at a time, at least one of the alternative candidate passwords to a component of the wireless network until the wireless network interface successfully connects to the wireless network or until each of the alternative candidate passwords has been submitted;
wherein the decoding utilizes a language model, the acts further comprising:
identifying a candidate password of the alternative candidate passwords that, upon submittal to the component of the wireless network, results in the wireless network interface successfully connecting to the wireless network; and
sending the candidate password of the alternative candidate passwords over the wireless network and to an entity to allow the entity to train the language model or another language model using the candidate password of the alternative candidate passwords.

2. An apparatus as recited in claim 1, wherein the request instructs a user to spell the password associated with the wireless network.

3. An apparatus as recited in claim 1, wherein the submitting comprises submitting the alternative candidate passwords in accordance with a ranked list of the alternative candidate passwords.

4. An apparatus as recited in claim 1, wherein:
each of the alternative candidate passwords is associated with at least one of: a probability or confidence level that the audio includes a sequence of sounds representing the respective candidate password, or a probability or confidence level that the audio includes a sequence of sounds representing a sequence of graphemes forming the respective candidate password; and
the submitting comprises submitting, one at a time, the alternative candidate passwords based at least in part on the respective probabilities or confidence levels of the alternative candidate passwords.

5. An apparatus as recited in claim 1, the acts further comprising causing the speaker to output an indication that a connection to the wireless network has been established.

6. An apparatus as recited in claim 1, the acts further comprising:
causing the speaker to output a request for an identifier of a wireless network;
receiving audio captured by the microphone after the speaker outputs the request for the identifier; and
identifying the wireless network at least partly based on the audio captured by the microphone after the speaker outputs the request for the identifier.

7. A method implemented at least in part by an electronic device coupled to a microphone, the method comprising:
determining, at least partly from audio captured by the microphone, a first candidate string of characters represented by an utterance from a user and a second candidate string of characters represented by the utterance from the user;
submitting the first candidate string of characters to a component of a network;
determining whether a connection has been established with the network after submitting the first candidate string of characters; and
submitting the second candidate string of characters to the component of the network at least partly in response to determining that the connection with the network has not been established after submitting the first candidate string of characters.

8. A method as recited in claim 7, wherein the first candidate string of characters is a most likely string of characters represented by the utterance of the user and the second candidate string of characters is a next most likely string of characters represented by the utterance of the user.

9. A method as recited in claim 7, wherein the submitting of the first candidate string of characters and the submitting of the second candidate string of characters comprises submitting each of the respective strings as a password for connecting with the network.

10. A method as recited in claim 7, further comprising instructing a user to spell a password for connecting to the network prior to determining the first candidate string of characters and the second candidate string of characters from the audio.

11. A method as recited in claim 7, wherein the determining further determines a predefined number of additional candidate strings of characters at least partly from the utterance from the user, and further comprising:
determining whether the connection has been established with the network after submitting the second candidate string of characters; and
submitting, one at a time, at least one of the additional candidate strings of characters to the component of the network.

12. Non-transitory computer-readable media storing computer-executable instructions that, when executed on a processor, cause the processor to perform acts comprising:
decoding audio at least in part to determine a number of alternative character strings from the audio; and
submitting, one at a time, the alternative character strings as a password until the earlier of authentication or until each of the number of alternative character strings has been submitted;
wherein the decoding utilizes a language model, the acts further comprising:
identifying a candidate character string of the alternative character strings that, upon submittal, results in authentication; and
sending the candidate character string of the alternative character strings over a wireless network and to an entity to allow the entity to train the language model or another language model using the candidate character string of the alternative character strings.

13. Non-transitory computer-readable media as recited in claim 12, wherein each of the alternative character strings is determined with reference to a probability or confidence level that the audio includes a series of sounds representing the respective character string.

14. Non-transitory computer-readable media as recited in claim 12, wherein each of the alternative character strings is determined with reference to a probability or confidence level that the audio includes a series of sounds representing a series of graphemes forming the respective character string.

15. Non-transitory computer-readable media as recited in claim 12, wherein the submitting comprises submitting the alternative character strings, one at a time, in an order based at least in part on respective probabilities or confidence levels that the audio includes respective series of sounds representing the respective character strings.

16. Non-transitory computer-readable media as recited in claim 12, wherein the submitting comprises submitting the alternative character strings, one at a time, in an order based at least in part on respective probabilities or confidence levels that the audio includes respective series of sounds representing respective series of graphemes forming the respective character strings.

17. Non-transitory computer-readable media as recited in claim 12, wherein the submitting comprises submitting the alternative character strings, one at a time, beginning with a character string corresponding to a series of sounds that is most likely to be included in the audio.

18. Non-transitory computer-readable media as recited in claim 12, wherein the submitting comprises submitting the alternative character strings, one at a time, beginning with a character string corresponding to a series of graphemes corresponding to a series of sounds that is most likely to be included in the audio.

19. Non-transitory computer-readable media as recited in claim 12, wherein the authentication is effective to grant access to an online account, a wireless network account, a wired network account, a computing device, an application, or a content item.

20. Non-transitory computer-readable media as recited in claim 12, the acts further comprising ranking the alternative character strings, and wherein the submitting of the alternative character strings comprises submitting the alternative character strings, one at a time, in accordance with the ranking.

21. Non-transitory computer-readable media as recited in claim 12, the acts further comprising outputting an indication of whether or not access to an account has been received.

22. Non-transitory computer-readable media as recited in claim 12, the acts further comprising outputting a request that a user utter the password for an account.

23. Non-transitory computer-readable media as recited in claim 12, the acts further comprising outputting a request that a user spell the password for an account.

\* \* \* \* \*